Dec. 25, 1934.　　　G. B. INGERSOLL　　　1,985,728
BALL AND SOCKET JOINT
Original Filed Nov. 15, 1927
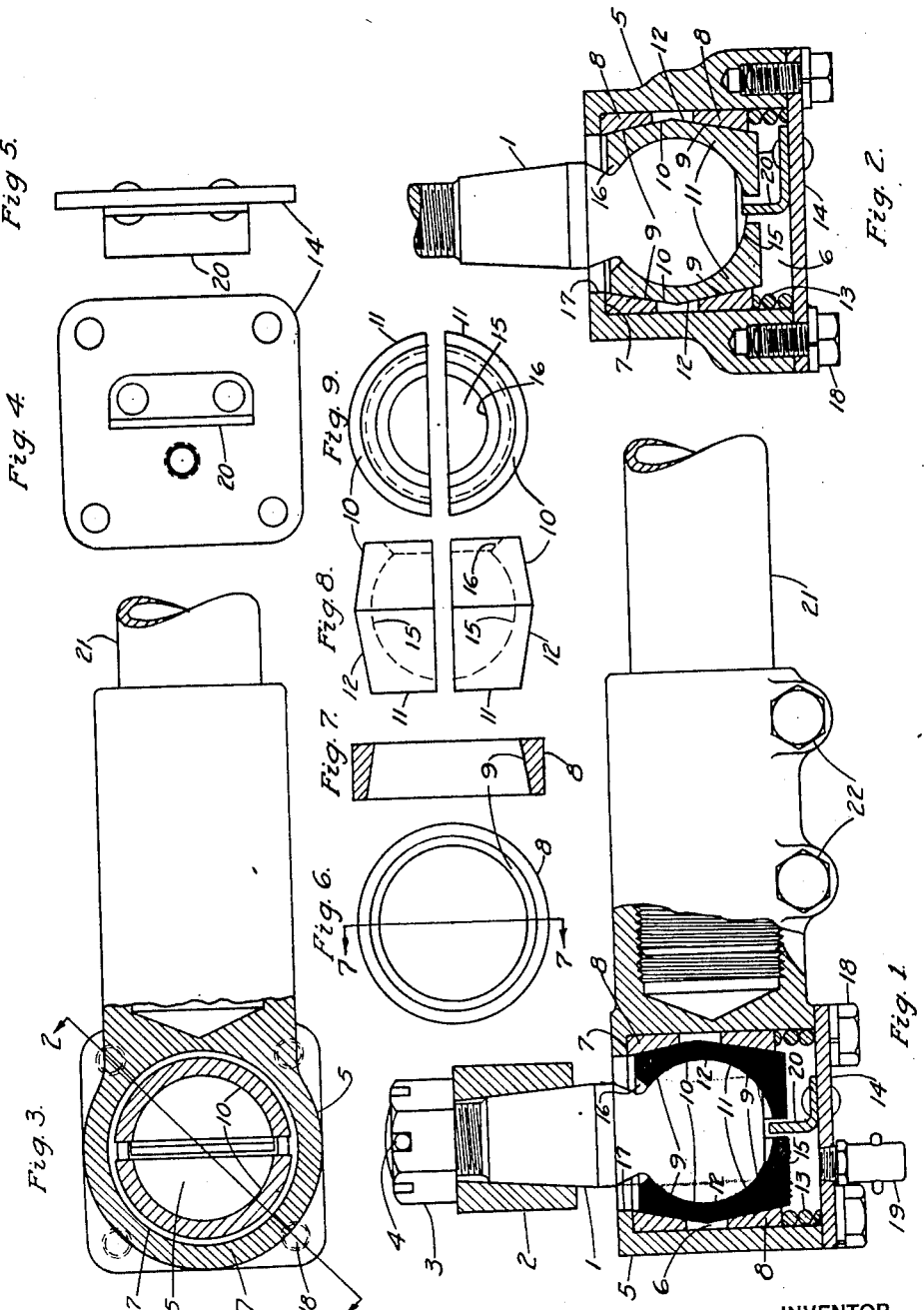
INVENTOR
George B. Ingersoll.

Patented Dec. 25, 1934

1,985,728

UNITED STATES PATENT OFFICE 1,985,728

BALL AND SOCKET JOINT

George B. Ingersoll, Dearborn, Mich., assignor, by mesne assignments, to Thompson Products, Incorporated, Cleveland, Ohio, a corporation of Ohio Application November 15, 1927, Serial No. 233,495
Renewed June 7, 1934

9 Claims. (Cl. 287—90)

My invention relates to improvements in ball and socket joints as used in the cross tie rod connecting the steering arms of the front axle in motor vehicles.

The object of this invention is, first, to provide a joint with ball sockets having maximum bearing surfaces on the sides of maximum thrust load; second, to provide a joint having an automatic means for adjusting each socket in an opposite direction from that of the maximum thrust load thereon; third, to provide a joint with ball sockets having automatic adjustment for their inner ball and their outer housing seats; fourth, to provide a joint capable of long life because of the exact seating of its component parts; fifth, to provide a joint having adjustable and removable ball sockets in a housing having a straight bore; and sixth, to provide ball joint sockets having an automatic means capable of exerting its adjusting forces throughout the total circumference of the ball sockets at each of their ends.

I attain these objects by the mechanism illustrated in the accompanying drawing, in which—

Figure 1 is a sectional side elevation of the ball and socket joint assembled on a steering ball stud; Fig. 2, a sectional view of the joint on the line 2—2, Fig. 3; Fig. 3, a plan view of the joint; Fig. 4, a plan view of housing cover; Fig. 5, an end view of the housing cover; Fig. 6, an end view of one of the adjusting rings; Fig. 7, a sectional view of the adjusting ring on the line 7—7, Fig. 6; Fig. 8, a side view of the ball socket pieces; and Fig. 9, an end view of the ball socket pieces.

Similar numerals refer to similar parts throughout the several views.

In Figure 1, a ball stud 1 is shown assembled in the boss 2 of a steering arm of the wheel spindle of a front axle assembly as used in motor vehicles. The ball stud 1 is held in position by the nut 3 and the cotter pin 4. The housing 5 has a straight hole 6 which has a shoulder 7 at its upper end. One of the adjusting rings 8 is pressed into the hole 6 against the shoulder 7 and has tapered surface 9 which contacts with a like tapered surface 10 on each of the socket pieces 11. One of the adjusting rings 8 has a good sliding fit in the hole 6 and its tapered surface 9 is forced into contact with a like tapered surface 12 on each of the socket pieces 11 by the spring 13 which is backed up by the cover 14. The socket pieces 11 have inner spherical surfaces 15 which fit around the ball of the stud 1 passing through the hole 16 in the socket pieces 11 and the hole 17 in the housing 5. The cover 14 is fastened to the housing 5 by screws 18 and has a connection 19 for supplying lubricant to the ball joint and its bearing surfaces. A plate 20 is fastened to the cover 14 and fits between the socket pieces 11 and thus maintains them in the correct position for efficiently taking the maximum thrust loads on the bearing surfaces of the inner spherical surfaces 15. The housing 5 is threaded on the steering cross tube 21 and the bolts 22 lock the housing 5 thereon. The spring 13 forces the lower adjusting ring 8 into contact with the socket pieces 11 and the socket pieces 11 are forced into contact with the ball stud 1 and the upper adjusting ring 8, thus automatically maintaining all of the various bearing surfaces in proper contact and eliminating any destructive wear on any of the parts.

I claim:

1. In a ball and socket joint, a housing having a bore, a fixed ring in the bore of the housing, the said fixed ring having an inner tapered surface, a plurality of socket pieces, each of the said socket pieces having two external tapered surfaces, one of the external tapered surfaces of each of the said socket pieces engaging the inner tapered surface of the said fixed ring, the said socket pieces each being further provided with an internal spherical surface, a slidable ring in the bore of the housing, the said slidable ring having an inner tapered surface engaging one of the external tapered surfaces on each of the said socket pieces, a ball stud extending within and engaging the internal spherical surfaces of the said socket pieces, and means for forcing the said slidable ring into engagement with the said socket pieces.

2. In a ball and socket joint, a housing having a bore, a stud having a ball end extending within the bore of the housing, socket pieces enclosing the ball end of the said stud, each of said socket pieces having oppositely disposed tapered surfaces, a pair of rings enclosing the said socket pieces, each of said rings having tapered surfaces engaging the tapered surfaces of said socket pieces, and means adjustably maintaining the said pair of rings in contact with the said socket pieces, the said socket pieces thereby being adjustably maintained in contact with the ball end of the said stud.

3. In a ball and socket joint comprising a member having a ball end, the combination of socket pieces enclosing said ball end, each of said socket pieces having oppositely disposed tapered surfaces, a pair of rings enclosing said socket pieces, each of said rings having tapered surfaces engaging the tapered surfaces of said socket pieces, a housing enclosing said pair of rings, and means for continuously forcing one of said pair of rings toward the other of said pair of rings, said pair of rings thereby continuously forcing said socket pieces into engagement with said ball end.

4. In a ball and socket joint, a housing with a bore, a stud having a ball end extending within the bore of the housing, a plurality of socket pieces enclosing the ball end of the said stud, the said socket pieces having a pair of inclined surfaces oppositely disposed, a pair of rings having tapered surfaces oppositely disposed, the said tapered surfaces enclosing the said socket pieces and contacting therewith, and means maintaining the said pair of inclined surfaces in contact with the said socket pieces.

5. In a ball and socket joint, a housing member having a bore, a stud having a ball end extending within the bore of the said housing member, a plurality of socket pieces enclosing the ball end of the said stud, each of the said socket pieces having oppositely disposed tapered surfaces, a fixed member having a tapered surface contacting with one of the oppositely disposed tapered surfaces of each of the said socket pieces, a slidable member in the bore of the said housing, the said slidable member having a tapered surface contacting with one of the oppositely disposed tapered surfaces of each of the said socket pieces, and means for maintaining the said slidable member in contact with the said socket pieces.

6. In a ball and socket joint, a housing with a bore, a stud with a ball end extending within the bore of the housing, a plurality of socket pieces enclosing the ball end of the said stud, each of the said socket pieces having oppositely disposed tapered surfaces, a fixed member having a tapered surface contacting with one of the oppositely disposed tapered surfaces of each of the said socket pieces, a slidable member in the bore of the said housing, the said slidable member having a tapered surface contacting with one of the oppositely disposed tapered surfaces of each of the said socket pieces, means for maintaining the said slidable member in contact with the said socket pieces, and means for maintaining the said socket pieces from rotating relative to said housing.

7. In a ball and socket joint, a housing having a bore, a stud having a ball end extending within the bore of the housing, annular members in the bore of the housing, the said annular members each having an internal tapered surface, a plurality of socket pieces enclosing the ball end of the said stud, the said socket pieces each having a tapered surface engaging the internal tapered surfaces of the said annular members, and means for maintaining the said annular members in contact with the said socket pieces.

8. In a ball and socket joint, a housing having a straight bore, a member closing one end of the bore of said housing, a stud having a ball end extending within the bore of the housing, a pair of adjusting rings in the bore of the housing, the said pair of adjusting rings being oppositely disposed relative to the center of the ball end of the said stud, a plurality of socket pieces, each engaging both of said pair of adjusting rings, the said plurality of socket pieces enclosing the ball end of the said stud, resilient means interposed between one of the said adjusting rings and said member, the said resilient means thereby adjustably maintaining both of the said adjusting rings in contact with the said socket pieces, the said socket pieces being further adjustably maintained in contact with the ball end of the said stud.

9. A ball and socket joint comprising a member having a spherically shaped head, a plurality of socket members each having a spherical surface seating against the said head, the said members forming an enclosure with a main opening at one end only, a housing, an annular member in the said housing, said member having a tapered inner surface engaging said socket members, a slidable member in the bore of the said housing, the said slidable member engaging the said socket members, and means for maintaining the said slidable member in contact with the said socket pieces.

GEORGE B. INGERSOLL.